Jan. 19, 1960     R. B. PARKER     2,921,854
POWDERED YEAST PRODUCT AND METHOD OF MAKING SAME
Filed Jan. 24, 1958

INVENTOR.
*Richard B Parker*
BY
ATTORNEY

United States Patent Office 2,921,854
Patented Jan. 19, 1960

2,921,854

POWDERED YEAST PRODUCT AND METHOD OF MAKING SAME

Richard B. Parker, Los Angeles, Calif., assignor to Carnation Company, Los Angeles, Calif., a corporation of Delaware Application January 24, 1958, Serial No. 710,968

12 Claims. (Cl. 99—96)

The present invention relates generally to a non-viable dehydrated food product of a type intended to be dispersed in water or compressed into pill form.

Dry non-viable yeast consists of the dry cells of any suitable strain of *Saccharomyces cerevisiae* and *Torulopsis utilis*. Broadly, yeast may be described as a true fungi whose usual and dominant growth form is unicellular. *Torulopsis utilis* is used extensively for fortification of foods and feeds and is obtained from the commercial fermentation of wood residue and sulfite waste liquor from the paper industry. *Saccharomyces cerevisiae* may be obtained as a by-product from any suitable fermentation process such as for example, the brewing of beer which has been made from an extract of cereal grains and hops. The dry cells are centrifuged from the fermenting solution and washed clean. They are then dried. The final products of each of these strains of yeasts are in the form of a relatively fine powder, the individual particles of the powder being substantially of the order of from 4 to 20 microns in size. The final products can also contain vitamins of the B complex group and are highly nutritious because of their relatively large protein and vitamin content.

Present day dehydrated yeast is a highly hygroscopic product because of its previously mentioned substantially high protein level. For this reason, and because the product is in such fine particle form, it resists wetting when a given quantity is placed upon a quantity of water. It is generally assumed that this resistance to wetting is due to the fact that the particles which initially come into contact with water form a sticky layer and the adjacent particles tend to coalesce to form a barrier which blocks water penetration. In other words, the protein of the individual particles readily absorb water and become sticky in character. Adjacent sticky particles, therefore, tend to stick and adhere together which in turn forms a wall which prevents water penetration. Additional stirring or agitation tends only to break the larger lumps into smaller lumps and the product can be completely dispersed in water only after violent mechanical agitation.

Present day dry yeast as previously suggested is extremely hygroscopic and in the manufacture of pills this tendency of the product to absorb moisture and cake seriously handicaps the use of the product in pill form.

It has long been appreciated that it would be advantageous to have a dehydrated non-viable yeast food which would be capable of ready dispersibility in cold water without excessive agitation or preliminary mixing in paste form and which would be free-flowing and not subject to caking.

It is therefore an object of the present invention to provide a product having the desirable characteristics described above.

It is a further object of the present invention to provide a product of the above character which may be dispersed in water by simple stirring to form an acceptable beverage.

Another object of the present invention is to provide a novel process for the manufacture of the above product which is adapted for low-cost quantity production without injury to heat sensitive components.

A still further object of the present invention is to provide a free flowing dehydrated non-viable yeast product and a method for manufacturing such a product.

Other objects of the invention will be readily apparent to those familiar with the art upon perusal of the following description and drawings in which.

In accordance with the present process, I first provide or prepare an initial dehydrated non-viable yeast powder. This product is readily available through commercial channels and, as previously suggested, is a by-product of commercial fermentation and is in relatively fine powder form, the individual particles being substantially spherical in shape and in sizes ranging from 4 to 20 microns. This fine powder is then processed by an aggregation treatment in which the individual particles are moistened to an extent sufficient to render them sticky and adhesive. The sticky particles are then caused to adhere together in the form of aggregates which are of random shape and of a size substantially larger than the size of the individual particles. Thereafter the material is subjected to drying to adjust the final moisture content to a predetermined value.

Figure 1:
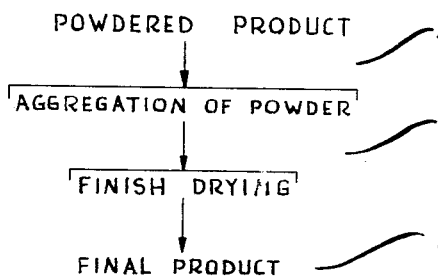
Fig. 1 is a flow sheet illustrating the method of manufacture of this novel yeast product.

Referring now specifically to Fig. 1, it will be noted that the steps of the process are illustrated in flow sheet form. Step 10 specifies the steps of supplying the dehydrated non-viable yeast powder to the aggregation treatment step. As previously suggested, this initial powdered yeast product resists wetting and can be dispersed in water only with violent agitation or going through an initial paste step. The product is also extremely hygroscopic because of its relatively high protein content which causes caking and difficulty in manufacturing pills of the product.

At the aggregation treatment step, sufficient moisture is added, the specific moisture level will be set forth in detail hereinafter, to render the surfaces of the individual particles adhesive and while these particles are in their sticky phase, they are commingled and caused to adhere together in the form of aggregates of a size substantially greater than the size of the individual particles. Step 11 specifies that these moist aggregates are supplied to a drying zone or treatment where the moist product is subjected to a drying air of a temperature sufficient to remove the excess water. The final product, indicated by the number 12, contains 8½ percent moisture or less and is formed of random shaped aggregates.

As will be explained more fully hereinafter, this random shaped final product is relatively instantly wettable and can be dispersed in water by simple stirring. By wettable I have reference to the ability of the product to sink immediately below the surface of the water. As explained above, the initial product does not possess this ability and forms lumps upon initial contact with the water. This aggregated product is also free flowing and will not cake. For this reason it will flow through processing equipment used in the manufacture of pills without caking or plugging the various delivery conduits.

Figure 2:
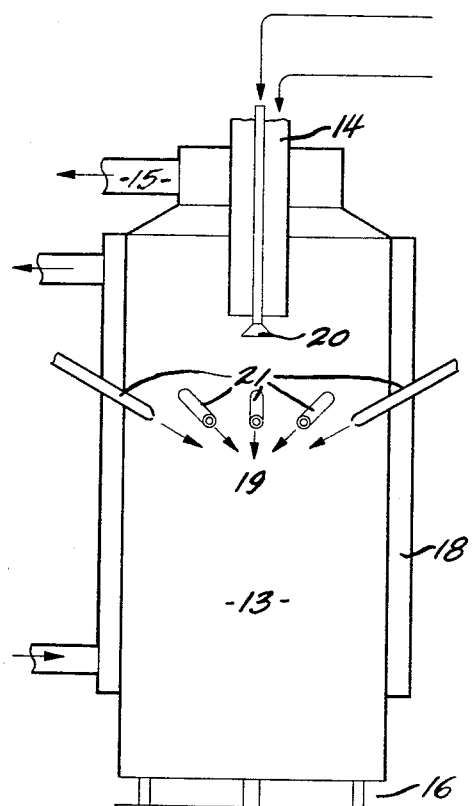
Fig. 2 is a schematic view illustrating a suitable apparatus for effecting the aggregation of the product.

Fig. 2 illustrates suitable apparatus which can be used for carrying out the aggregation of the initial product. This apparatus is similar to that disclosed and claimed in co-pending application Serial No. 370,420, filed July 27, 1953, in the name of David D. Peebles, now Patent No. 2,835,586, and co-pending application Serial No. 573,910, filed March 26, 1957, in the name of David D. Peebles. More specifically, this apparatus consists of a vertical chamber 13 having a downwardly extending inlet 14 for receiving the powder mix as conveyed pneumatically from a supply hopper. Some air is removed from chamber 13 through a conduit 15 whereby air is drawn into the chamber through an opening 16 between the main part of the chamber and a discharge cone 17. The sides of the chamber 13 can be kept warm by circulating warm air through a jacket 18 thereby preventing the condensing of moisture on the inner chamber surface. The free flowing powder passes through a treatment zone 19 where it is commingled with finely atomized water discharged from a nozzle 20. Also, some saturated steam can be introduced by means of nozzles 21 and the falling powder acquires sufficient moisture while in the treatment zone whereby the material discharged out of cone 17 has a moisture content (total) ranging from 16 percent to 35 percent, about 25 percent would be optimum. This final product is subjected to finished drying 11 to produce a final product having a total moisture content suitable for a commercial product, such as for example, a total moisture content of preferably 8½ percent or less. The preferred temperature level in the treatment zone is in the order of from 80° to 120° F.

As the particles of the initial powder are commingled with the vapor and atomized water, moisture distributes itself on the surfaces of the particles whereby the particles receive sufficient moisture to render their surfaces adhesive or sticky. In addition, these particles will commingle sufficiently in the treatment zone in such a manner that random contacts occur between the particles in suspension to cause them to adhere together in the form of aggregates of random shape. The aggregates are made up of a plurality of particles of the initial product and correspondingly have a size substantially greater than the size of the individual particles.

The total time period for the treatment of the initial powder in the chamber 13 may range from 2 to 20 seconds. The moist aggregates which are discharged through the discharge cone 17 are deposited upon an endless belt 22 which carries the material to the finished drying operation 11. It is also possible to deposit or discharge the moist aggregates directly from the chamber 13 to the finished drying operation 11.

While any suitable apparatus or procedure can be used for removing the excess moisture in the finished drying operation, it has been found desirable to avoid such mechanical handling as will break up the formed aggregates. A desirable drying procedure is to deposit the moist aggregates upon a screen which is vibrated to move the material from its delivery end to its discharge end. This screen is perforated and a warm drying air is directed upwardly through the perforated screen. The perforations of the screen and its vibration and the amount of drying air directed through the screen are so calculated that the apron of product moving along the screen will be fluffed so that its thickness will be several times normal. By this technique the product is supported on a cushion of air which is intermingled therewith and this provides a drying action without rough mechanical handling. In such a procedure, the temperature of the drying air can be of the order of from 200°–300° F.; from 230° to 270° F. being deemed optimum.

Treatment in the apparatus disclosed in Fig. 2 and the final drying operation must be carried out under such time temperature conditions as to avoid any undesirable change in denaturization of the yeast protein. It has been found, therefore, that processing the initial powder through the chamber 13 in from 2 to 20 seconds, adding sufficient moisture so that the moist aggregates discharged through the discharge cone 17 have a total moisture content of from 16 percent to 35 percent, effecting the final drying operation with a drying air of a temperature of from 230° to 270° F. in 2 minutes causes no undesirable change in flavor or physical factors and no appreciable reduction in the vitamin level.

As previously pointed out, the aggregation treatment serves to establish firm bonds between the particles of the initial starting material so that the final product is in the form of random aggregates of a size substantially greater than the size of the individual particles. This form of the product imparts to the product the desirable characteristic of relatively high wettability. Therefore, when a spoonful of the product is dropped into a tumbler containing water, it floats upon the surface of the water for only a very short period of time and then progressively sinks below the water surface. After sinking, the product can be easily dispersed by simple stirring with a spoon or other instrument. Sticky lumps do not form which impair dispersibility. A further desirable characteristic is that the product is free flowing. In other words, the product, due to the hygroscopic nature of the protein, will not cake and therefore can be directed through delivery conduits in a pill-forming operation without fouling up these conduits by reason of this caking. A still further characteristic of this product is the fact that its flavor characteristics have not been impaired or changed to any extent. Therefore, nutritionally as well as flavorwise the product is identical to the initial starting material.

A specific method for the manufacture of aggregated *Torulopsis utilis* yeast is as follows:

An initial yeast product was obtained through conventional commercial channels and this product was made up of individual yeast particles which ranged in size from 5 to 20 microns and which were oblate spheroid or possibly even lemon-shaped in character. This initial yeast product was fed into the treatment zone at the rate of 1000 pounds per hour and sufficient atomized water and saturated steam were introduced to raise the total moisture content of the product to 25.1%. The temperature in the treatment zone was on or about 100° F. The individual particles of the initial yeast product became sticky and adhesive and adhered together in aggregate form.

The final drying was effected by a pair of perforated screens which are vibrated in the manner as previously suggested. One of the screens received the moistened aggregated product from the hydrator and fed the same unto the second screen. An air flow rate of 1800 c.f.m. was directed through both screens and the temperature of the drying air directed through the first screen was on or about 250° F. and the temperature of the drying air directed through the second screen was on or about 240° F.

The final moisture of the finished product discharged by the second screen was 7.05% and 100 pounds of the initial product was processed in six minutes.

The screen analysis of the product obtained was as follows:

| | Percent |
|---|---|
| Retained on 60 mesh | 66 |
| Pass 60 and retained on 100 mesh | 2 |
| Pass 100 and retained on 150 mesh | 4 |
| Pass 150 | 2 |

A specific method for manufacture of aggregated *Saccharomyces cerevisiae* yeast is as follows:

An initial dried food yeast obtained from ordinary commercial channels was introduced into the hydrator at a rate of on or about 800 pounds per hour. Sufficient atomized water and steam were introduced at the treatment zone so that the total moisture of the product discharged out of the hydrator varied from 23% to 27% while averaging 25%. The temperature in the treatment zone in the hydrator averaged on or about 75° F.

The secondary drying procedure was the same as outlined above and an air flow rate of 2200 c.f.m. was directed through both screens. The temperature of the drying air directed through the first screen was 290° F. and the temperature of the drying air directed through the second screen was 280° F. The product temperature at time of discharge from the second screen was 140° F. and the final product had a moisture content which ranged from 4.5% to 5.5%.

A screen analysis of this product is as follows:

| | Percent |
|---|---|
| Retained on 60 mesh | 73 |
| Pass 60 and retained on 100 mesh | 22 |
| Pass 100 and retained on 150 mesh | 2 |
| Pass 150 | 2 |

The initial dried food yeast can also be intermixed with dry powdered milk solids prior to introduction into the aggregating apparatus disclosed in Fig. 2. While any amount of dry powdered milk solids can be intermixed with the initial yeast food, and subsequently aggregated, it has been found that a mixture which comprises from 5% to 20% milk solids when aggregated results in a product which still retains its basic yeast characteristics.

Figure 3:
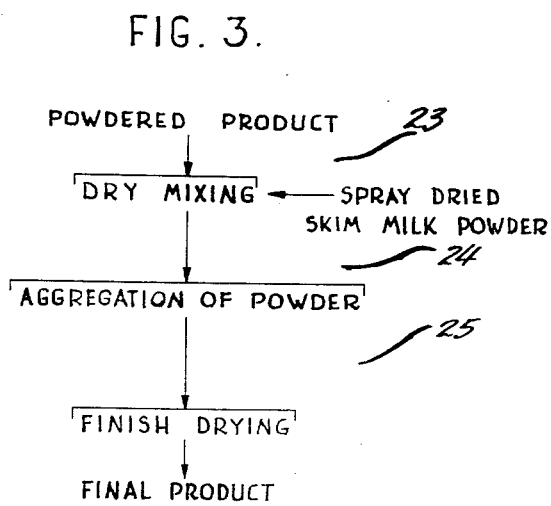
Fig. 3 is a flow sheet illustrating another method of manufacturing this novel yeast product.

Referring to Fig. 3 and as indicated in step 23, the initial yeast product, which as previously suggested can be the dry cells of any suitable strain of Saccharomyces cerevisiae and/or Torulopsis utilis, is mechanically intermixed with dry powdered milk solids such as is produced by conventional spray drying methods. Such a milk product has a substantial lactose content in anhydrous form and is relatively hygroscopic. This product is also characterized by its poor wettability and by the fact that it can be dispersed in cold water only after extended mechanical beating or agitation. Its particle size averages less than 70 microns. When such a milk powder is mechanically mixed with the initial yeast powder, a homogeneous mixture results in which the particles of milk solids are brought into intimate contact with the particles of the initial yeast product.

The mixture from step 23 is then directed into the treatment zone 19 of the aggregating apparatus and sufficient moisture in the form of atomized water and/or steam is added so that the total moisture content of the product ranges from 16% to 35% as previously suggested, about 25% being optimum. This step in Fig. 3 is indicated as 24. The resulting product is then subjected to finished drying, indicated as 25, in the same manner as previously suggested and the final product has a moisture content preferably less than 8½% and its screen analysis corresponds to the screen analysis of the previously described product.

What is claimed is:

1. A method for manufacture of a free-flowing powdered yeast product characterized by high wettability and dispersibility in water comprising the steps of moistening individual particles of dried yeast while such particles are passing through a treatment zone in dispersed condition to an extent sufficient to render them sticky, causing the sticky particles while passing through such treatment zone to adhere together in the form of random aggregates of a size substantially greater than the size of the individual particles and then removing the excess moisture without substantially crushing the aggregates so as to obtain an aggregated free-flowing material.

2. A method for the manufacture of a dried yeast product which is characterized by high wettability and dispersibility in water comprising introducing an initial dried yeast product which is composed of substantially spherical particles into a treatment zone, moistening the individual particles of said initial dried yeast product while dispersed in said treatment zone to an extent sufficient to render them sticky, causing the sticky particles while dispersed in said treatment zone to contact and adhere together in the form of random aggregates of a size substantially greater than the particle size of the initial dried yeast product, and then removing the excess moisture from the aggregates without substantially crushing the same to form a free-flowing granular final product.

3. The process defined in claim 2 further characterized by said initial dried yeast product consisting of the dry cells of any suitable strain of Saccharomyces cerevisiae.

4. The process defined in claim 2 further characterized by said initial dried yeast product consisting of the dry cells of any suitable strain of Torulopsis utilis.

5. The process defined in claim 2 further characterized by the particles as they leave the treatment zone having a total moisture content of from 16% to 35%.

6. The process defined in claim 2 further characterized by the particles as they leave the treatment zone having a total moisture content of on or about 23% to 27%.

7. The process defined in claim 2 further characterized by removing the excess moisture from the aggregate to form a final free-flowing aggregated material having a moisture content of the order of less than 8½%.

8. As a new article of manufacture a free-flowing aggregated product comprising particles of dry individual cells of yeast powder firmly adhered together in the form of random aggregates of a size substantially greater than the particle size of the initial yeast product.

9. As a new article of manufacture a free-flowing aggregated product comprising particles of dry cells of any suitable strain of Saccharomyces cerevisiae firmly adhered together in the form of random aggregates of a size substantially greater than the particle size of the initial powder.

10. As a new article of manufacture a free-flowing aggregated product comprising particles of dry cells of any suitable strain of Torulopsis utilis firmly adhered together in the form of random aggregates of a size substantially greater than the particle size of the initial powder.

11. The process defined in claim 2 further characterized by said initial dry yeast product being intermixed with powdered milk solids.

12. The process defined in claim 2 further characterized by said initial dry yeast product being intermixed with from 5% to 20% powdered milk solids.

References Cited in the file of this patent

UNITED STATES PATENTS

| 1,155,977 | Vernon | Oct. 5, 1915 |
| 1,557,764 | Neil | Oct. 20, 1925 |
| 2,019,363 | Schulz | Oct. 29, 1935 |
| 2,233,251 | Draghi | Feb. 25, 1941 |
| 2,717,837 | Schultz et al. | Sept. 13, 1955 |
| 2,856,288 | Peebles | Oct. 14, 1958 |